United States Patent [19]

Cho

[11] Patent Number: 6,125,386
[45] Date of Patent: Sep. 26, 2000

[54] METHOD FOR PROCESSING MESSAGES IN MULTIUSER DUNGEON

[75] Inventor: Tae-hee Cho, Seoul, Rep. of Korea

[73] Assignee: Samsung Electronics Co., Ltd., Kyungki-Do, Rep. of Korea

[21] Appl. No.: 09/053,763

[22] Filed: Apr. 2, 1998

[30] Foreign Application Priority Data

Dec. 9, 1997 [KR] Rep. of Korea ............. 97-67086

[51] Int. Cl.[7] .................................................. G06F 13/00
[52] U.S. Cl. ..................... 709/205; 709/204; 709/248; 709/313
[58] Field of Search ............................... 709/204, 205, 709/206, 207, 230, 237, 248, 310, 313, 329; 463/40, 41, 42

[56] References Cited

U.S. PATENT DOCUMENTS

| 5,775,996 | 7/1998 | Othmer et al. | 463/40 |
| 5,899,810 | 5/1999 | Smith | 463/42 |
| 5,974,422 | 10/1999 | Adams | 709/200 |

FOREIGN PATENT DOCUMENTS

| 9-155065 | 6/1997 | Japan | A63F 9/22 |
| 9-244984 | 9/1997 | Japan | G06F 13/00 |

OTHER PUBLICATIONS

Internet Magazine, Inpuresu, K.K. Nov. 11, 1997, vol. No. 34 pp. 218–239.

Primary Examiner—Viet D. Vu
Attorney, Agent, or Firm—Sughrue, Mion, Zinn, Macpeak & Seas, PLLC

[57] ABSTRACT

A method for processing messages in a multiuser dungeon operating on a computer system connected with other computer systems via a network eliminates message conflicts due to network time delays. The message processing method according to the present invention includes processing a received message when the current received message was generated on the direct basis of an event of an last received message which was received immediately prior to the current received message, processing the current received message as an error when the current received message is was not generated on the direct basis of the event of the last received message or a message received immediately prior to the last received message, stopping the processing of the last received message and processing the current received message when the current received message was generated on the direct basis of the event of the message received just prior to the last received message and the generation time of the event of the current received message is before the generation time of the event of the last received message, and discarding the received message when the current received message was generated on the direct basis of the event of the message received just prior to the last received message and the generation time of the event of the current received message is after the generation time of the event of the last received message.

3 Claims, 4 Drawing Sheets

METHOD FOR PROCESSING MESSAGES IN MULTIUSER DUNGEON

BACKGROUND OF THE INVENTION

1. Field of the Invention

The present invention relates to a multiuser dungeon in a network, and more particularly, to a method for processing a message in the multiuser dungeon operating on the network with multiple computer systems.

2. Description of Related Art

A conventional multiuser dungeon operates in a server system 100 as shown in FIG. 1A. User computers 110, 112, 114, and 116 receive inputs from respective users, transmit the inputs to a server system 100, receive the result of an operation (i.e., a current situation) from the server system 100, and display the result on a screen. However, if a fast information exchange is not performed between the server system 100 and the user computers 110, 112, 114, and 116 when a multiuser dungeon is performed as shown in FIG. 1A, the multiuser dungeon cannot be correctly performed due to the time delay on the network.

To address this problem, the multiuser dungeon shown in FIG. 1B is used. Namely, the user computers 160, 162, 164, and 166 operate separate game programs and transmit a message including the contents of an event to other user computers through a network 150 only when a new event is generated.

The method for processing information in the multiuser dungeon shown in FIG. 1B will be described as follows, using a baseball game as an example. When a user computer 160 playing a role of a pitcher receives a command for pitching a ball from a user, the user computer 160 generates a new event message and transmits it to the other user computers 162, 164, and 166. Then, not only the user computer 160 playing a role of a pitcher but also the user computers 162, 164, and 166 which received the new event message calculate the trajectory of the pitched ball and display it on a screen. Therefore, a network traffic is reduced and the user computers 160, 162, 164, and 166 can trace the location of the pitched ball. At this time, the change of the locations of the respective players, the operations of the players, and the change in the trajectory of the ball are basic events.

When the above-described method is used in the system shown in FIG. 1B, invalid messages are occasionally generated due to the delay of time on the network, and thus transmitted to other user computers. For example, when the event of a hitter hitting a ball is delayed on the network, a catcher may catch the ball before receiving the event of the hitter hitting the ball, thereby generating an event that the hitter is struck out. Since the ball passing the hitter reaches the catcher in a very short time, it is very likely that such a situation is generated.

SUMMARY OF THE INVENTION

It is an object of the present invention to provide a message processing method for a multiuser dungeon operated on a network, such as the INTERNET, in which a message conflict problem of generating an invalid message due to a time delay on the network is solved.

To achieve the above object, there is provided a method for processing messages received by a multiuser dungeon operating on a computer system connected with other computer systems by a network, comprising the steps of considering the received message as a normal message and processing it when the received message is generated on the direct basis of the event of the most recently received message, processing the received message as an error when the received message is not the message generated, on the direct basis of the event of the message received just prior to the most recently received message, stopping the processing of the most recently received message, considering the received message as a normal message, and processing it when the received message is the message generated on the direct basis of the event of the message received just prior to the most recently received message and the generation time of the event included in the received message is before the generation time of the event of the recently received message, and discarding the received message when the received message is generated, on the direct basis of the event of the message received just prior to the recently received message and the generation time of the event included in the received message is after the generation time of the event of the recently received message.

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENT(S)

Hereinafter, the present invention will be described in detail with reference to the attached drawings.

Figure 1A:
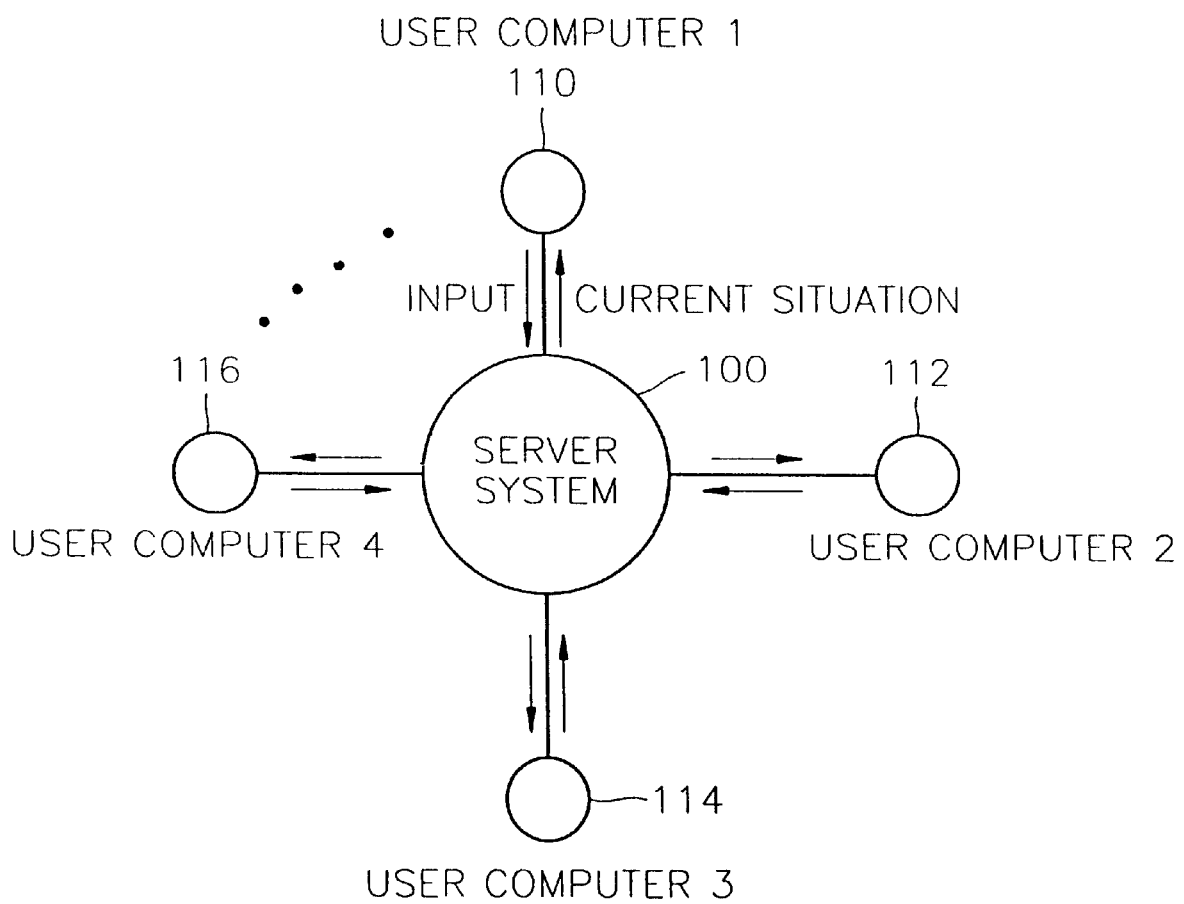
FIG. 1A shows the structure of the network in which a multiuser dungeon method is performed.
Figure 1B:
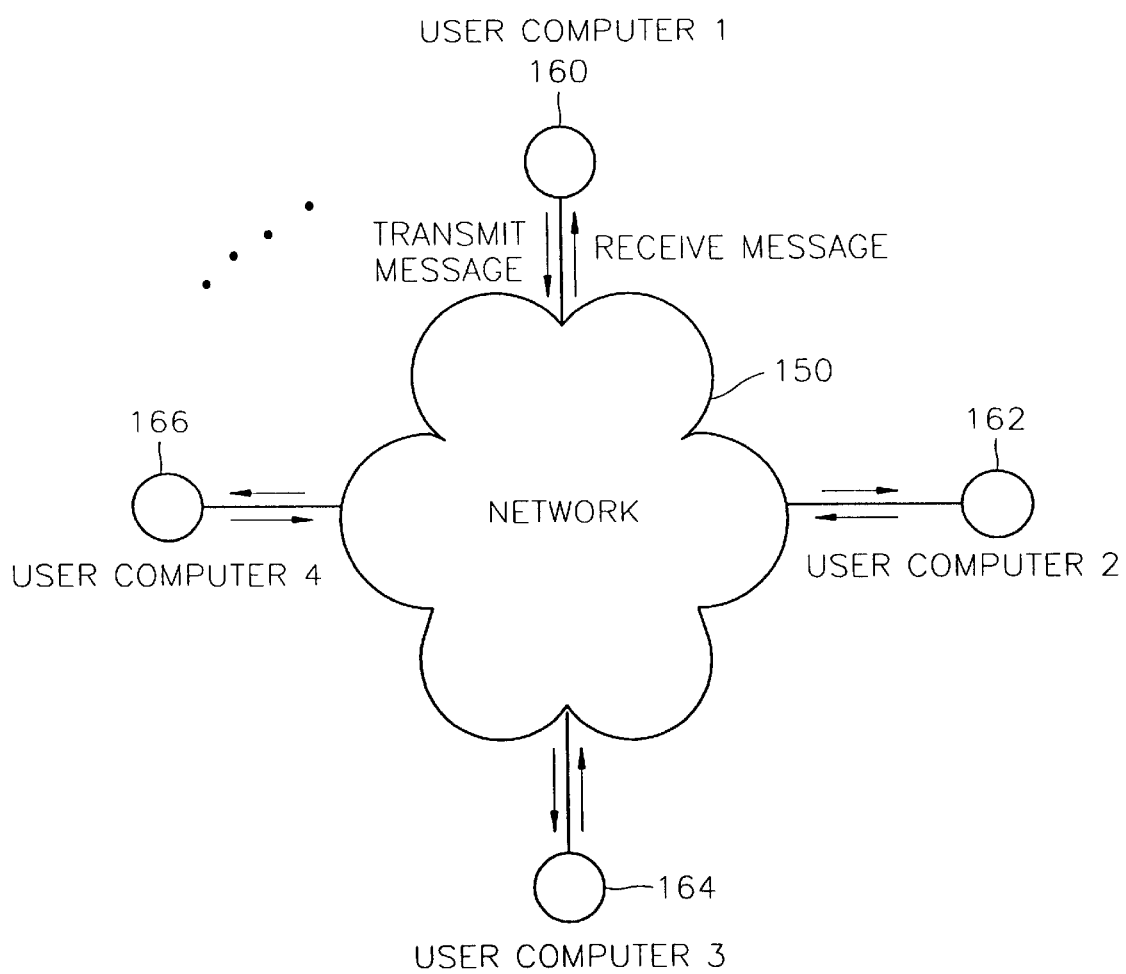
FIG. 1B shows the structure of the network in which a multiuser dungeon method is performed for the respective user computers.
Figures 2, 3:
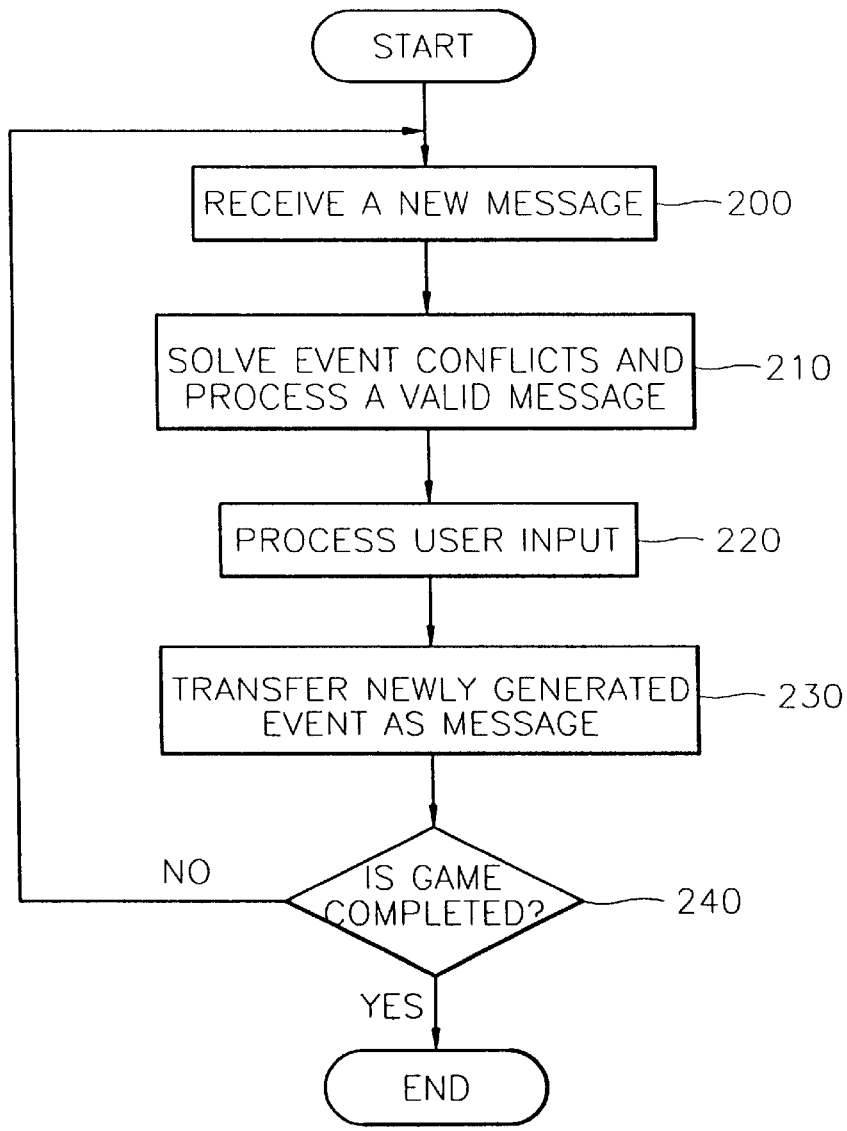
FIG. 2 is a flowchart showing processes of performing the multiuser dungeon in the method shown in FIG. 1B.
FIG. 3 shows the structure of a message used in the present invention.

Referring to FIGS. 1B and 2, a method for processing messages received by a multiuser dungeon performed by user computers 160, 162, 164 and 166 is as follows. If a new message received by a user computer from a network 150 is invalid, it is extracted in order to solve an event conflict (steps 200 and 210). Then, a message is generated with respect to a newly generated event by receiving inputs from a user and the generated message is transmitted to another computer through the network (steps 220 and 230). Steps 200 through 230 are repeated until the game is completed (step 240).

The present invention directed to solving event conflicts in step 210 in the above-described method. In order to solve the event conflict, a lastmsgID field is added to the structure of a general message, as shown in FIG. 3. Here, an eventID field is provided for displaying an identifier (ID) for identifying the respective events. A time field is provided for indicating a time at which an event is generated. An event_info field includes the contents of the events such as an event type, a location, a direction, and a speed. The lastmsgID field is provided for indicating the identifier of the event which is a direct basis for generating the event indicated by the message.

The data structures to be additionally managed by the multiuser dungeon having the message processing method according to the present invention are defined as follows. Namely, a lastmsg is the most recently received message in the respective user computers. A last_1 msg is the message received immediately prior to receiving the lastmsg.

Figure 4:
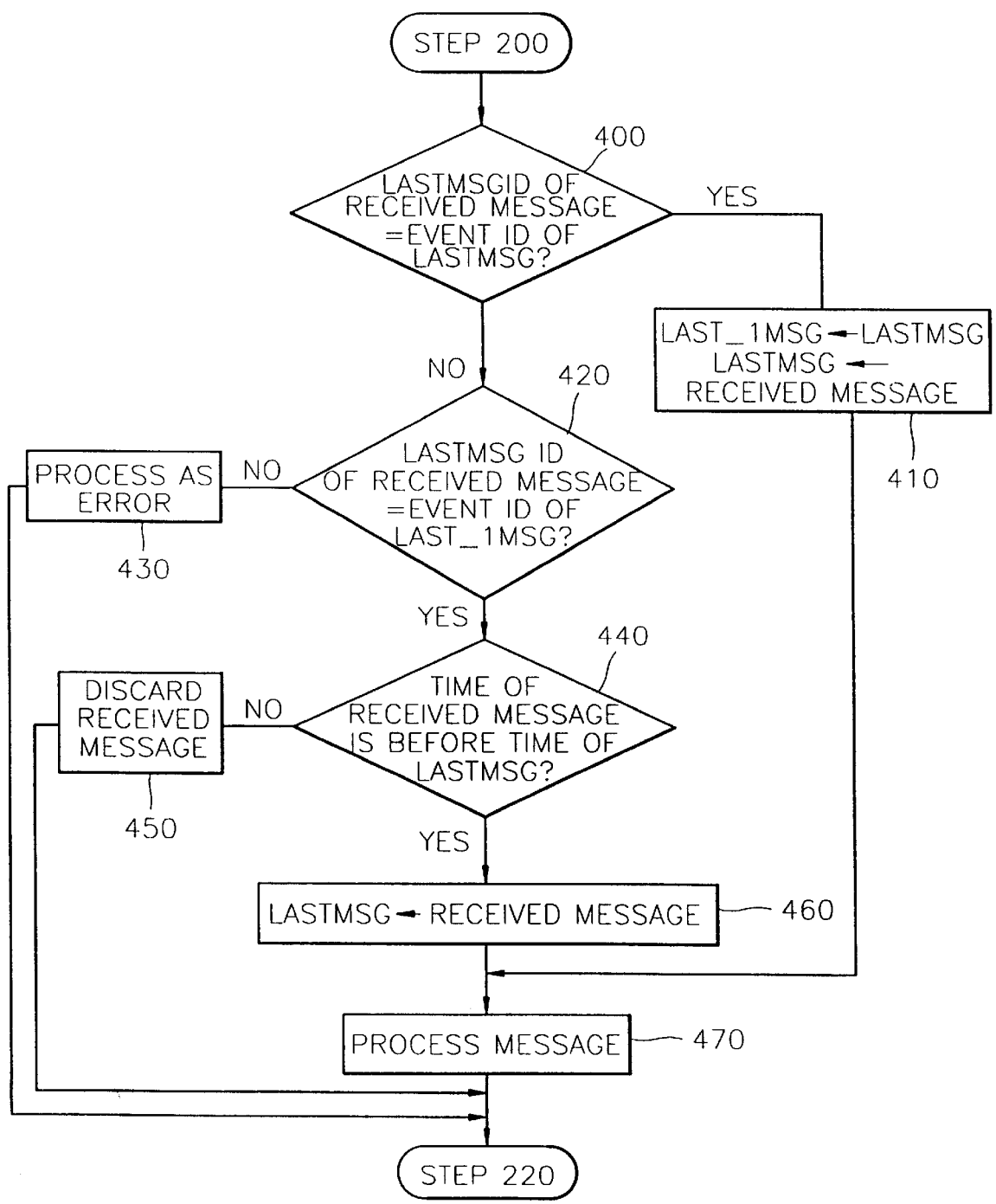
FIG. 4 is a flowchart showing steps of processing the received message of the multiuser dungeon according to the present invention.

In FIG. 4, processes for processing the message received by the multiuser dungeon having the above-mentioned message format and data structures are as follows. First, when the lastmsgID included in the received message is the same as the eventID included in the lastmsg, the received message is considered a normal message. Therefore, the lastmsg replaces the last_1 msg, the received message replaces the lastmsg, and a normal message process with respect to the received message is performed (steps 400, 410, and 470). This is because the user computer which transmitted the message and the user computer which received the message are operated on the basis of the same event.

If the lastmsgID included in the received message is not the same as the eventID included in the lastmsg, the state is abnormal. Therefore, when the lastmsgID of the received message is different from the eventID of the last_1 msg, it is considered that an error is generated and an error recovering process is executed (steps 420 and 430).

When the lastmsgID included in the received message is the same as the eventID included in the last_1 msg and the time included in the received message is the value after the time included in the lastmsg, the received message is discarded (steps 420, 440, and 450). This means that the received message is based on the same event as the lastmsg (i.e., message received previously) but the received message was wrongly generated since it was generated later than the lastmsg. Therefore, the received message is discarded.

Then, when the lastmsgID included in the received message is the same as the eventID included in the last_1 msg and the time included in the received message is the value prior to the time included in the lastmsg, the received message replaces the lastmsg and the received message is considered a normal message to be processed accordingly (steps 420, 440, 460, and 470). This means that the lastmsg (i.e., message received previously) is based on the same event as the currently received message but the lastmsg was wrongly generated since it was generated later than the currently received message. Therefore, an existing processing situation with respect to the wrongly received lastmsg is erased and the currently received message is processed as the normal message.

The above-described method will now be described, taking a baseball game as an example. The case in which the events of a pitcher pitches a ball (event 1), a hitter hits a ball (event 2), and a catcher catches a ball (event 3) are sent to another user as a message is assumed. Since event 2 and event 3 are both based on event 1, event 2 and event 3 conflict with each other. In this case, the user computer which received the two messages solves the conflict problem by discarding the event 3 which is generated later.

When the problem is solved by the above method, the multiuser dungeon operating in respective user computers shares the same situation after the lapse of the maximum delay time of the network from a user computer to another user computer.

The above example is for the case in which the message transmitted by the catcher is transmitted to a third party. However, the processes proceeding in the multiuser dungeon of the hitter or the pitcher are similar to the above method.

According to the present invention, in the multiuser dungeon operated using the network, such as the INTERNET, it is possible to solve a message conflict problem in which an invalid message is generated due to the delay of the network.

What is claimed is:

1. A method for processing messages received by a multiuser dungeon operating on a computer system connected with other computer systems by a network, the method comprising the steps of:

(a) determining whether a current received message was generated based on an event of a last received message which was received immediately prior to said current received message, and processing the current received message if it is determined that the current received message was generated based on the event of the last received message;

(b) determining whether the current received message was generated based on an event of a message received immediately prior to the last received message if it is determined in step (a) that the current received message was not generated based on the event of the last received message, and processing the current received message as an error if it is determined that the current received message was not generated based on the event of the message received immediately prior to the last received message;

(c) determining whether a generation time of the event of the current received message is a time value before a generation time of the event of the last received message if it is determined in step (b) that the current received message was generated based on the event of the message received immediately prior to the last received message, and stopping processing of the last received message and processing the current received message if it is determined that the generation time of the event of the current received message is a time value before the generation time of the event of the last received message; and (d) discarding the current received message if it is determined in step (c) that the generation time of the event of the current received message is a time value after the generation time of the event of the last received message.

2. The method of claim 1, wherein each of the current received message, the last received message, and the message received immediately prior to the last received message respectively comprises:

an identifier field for identifying an event;

a time field for indicating the generation time at which the event was generated;

an event information field for indicating the contents of the event; and a last message identifier field for identifying an immediately prior event which is a direct basis for the generating of the event.

3. The method of claim 1, wherein the step (a) further comprises replacing the message received immediately prior to the last received message with the last received message and replacing the last received message with the current received message, if it is determined that the current received message was generated based on the event of the last received message, and wherein the step (c) further comprises replacing the last received message with the current received message if it is determined that the generation time of the event of the current received message is a time value before the generation time of the event of the last received message.